United States Patent
Fukudome

(10) Patent No.: US 9,738,177 B2
(45) Date of Patent: Aug. 22, 2017

(54) ELECTRIC VEHICLE

(71) Applicant: TOYOTA JIDOSHA KABUSHIKI KAISHA, Toyota-shi, Aichi-ken (JP)

(72) Inventor: Hideki Fukudome, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/222,242

(22) Filed: Jul. 28, 2016

(65) Prior Publication Data
US 2017/0028871 A1 Feb. 2, 2017

(30) Foreign Application Priority Data

Jul. 30, 2015 (JP) .................... 2015-151270

(51) Int. Cl.
| | |
|---|---|
| B60L 15/20 | (2006.01) |
| B60T 8/17 | (2006.01) |
| B60T 1/10 | (2006.01) |
| B60T 15/38 | (2006.01) |
| B60L 15/38 | (2006.01) |
| B60T 13/66 | (2006.01) |
| B60T 8/1755 | (2006.01) |

(52) U.S. Cl.
CPC .......... *B60L 15/2009* (2013.01); *B60L 15/38* (2013.01); *B60T 1/10* (2013.01); *B60T 8/17* (2013.01); *B60T 8/1755* (2013.01); *B60T 13/662* (2013.01); *B60L 2240/423* (2013.01); *B60T 2201/03* (2013.01); *B60T 2270/60* (2013.01)

(58) Field of Classification Search
CPC ............... B60L 15/2009; B60L 15/38; B60L 2240/423; B60T 8/1755; B60T 13/662; B60T 1/10; B60T 8/17; B60T 2270/60; B60T 2201/03

See application file for complete search history.

(56) References Cited

U.S. PATENT DOCUMENTS

| | | | |
|---|---|---|---|
| 2014/0091744 A1* | 4/2014 | Suzuki | ...................... H02P 6/12 318/400.22 |
| 2014/0225541 A1* | 8/2014 | Omata | .................... H02P 27/04 318/400.09 |

FOREIGN PATENT DOCUMENTS

| | | | |
|---|---|---|---|
| JP | 2012105461 A | * | 5/2012 |
| JP | 2015-077834 A | | 4/2015 |

\* cited by examiner

*Primary Examiner* — Rodney Butler
(74) *Attorney, Agent, or Firm* — Sughrue Mion, PLLC

(57) ABSTRACT

Provided is an electric vehicle, including: motors configured to apply braking/driving torques to drive wheels via gear-type speed reducers; a braking apparatus; and a control device configured to calculate, for each drive wheel, a final target torque, which is a sum of a first target torque that is based on a braking/driving operation amount of a driver and a second target torque for controlling a travel behavior of the electric vehicle, and control the motors and the braking apparatus so that an actual braking/driving torque of the drive wheel reaches the final target torque. When the final target torque is a braking torque under a situation in which the first target torque is a driving torque, the final target torque is corrected to a value that is not a braking torque.

2 Claims, 5 Drawing Sheets

ELECTRIC VEHICLE

BACKGROUND

1. Technical Field

The present disclosure relates to an electric vehicle including motors each configured to apply a driving torque to a corresponding drive wheel via each gear-type speed reducer.

2. Description of the Related Art

Electric vehicles, such as electric automobiles, having such a mechanism that respective drive wheels are individually driven include motors each configured to apply a driving torque to a corresponding drive wheel, and a braking apparatus configured to apply a braking torque to each drive wheel independently of one another. In this type of electric vehicle, when a travel behavior of a vehicle is controlled through control of a braking/driving torque of each drive wheel, a final target braking/driving torque is calculated for each drive wheel, which is a sum of a first target braking/driving torque that is based on a braking/driving operation amount of a driver and a second target braking/driving torque for travel behavior control. Further, each motor and a braking apparatus are controlled so that an actual braking/driving torque of each drive wheel reaches a corresponding final target braking/driving torque.

The travel behavior control is performed to control a roll motion, a pitch motion, a yaw motion, and a heave motion of the vehicle, and thus the second target braking/driving torque changes between the driving torque and the braking torque. Thus, even when the first target braking/driving torque is a driving torque (powering torque), the final target braking/driving torque may change between the driving torque and the braking torque. In contrast, even when the first target braking/driving torque is a braking torque, the final target braking/driving torque may change between the braking torque and the driving torque.

In general, in the electric vehicle having the above-mentioned mechanism, the driving torque of each motor is transmitted to a corresponding drive wheel via each gear-type speed reducer. When the final target braking/driving torque changes between the driving torque and the braking torque, a reversal of the torque direction (hereinafter referred to as "zero cross") is caused, and the rotational direction of a gear is reversed. There is a backlash in the gear-type speed reducer, and thus teeth of engaging gears collide with each other when the rotational direction of a gear is reversed, with the result that an abnormal noise uncomfortable for occupants of the vehicle is generated.

For example, as described in Japanese Patent Application Laid-open No. 2015-77834, there is known a technology for offsetting final target braking/driving torques of front wheels and rear wheels in opposite directions in order to suppress the generation of the zero cross of a torque and its resultant generation of an abnormal sound. In this technology, offset torques in opposite directions and of the same magnitude are added to the final target braking/driving torques of the front wheels and the rear wheels, to thereby prevent the final target braking/driving torque of each wheel from changing across 0 without changing the sum of the final target braking/driving torques of the four wheels. Therefore, it is possible to prevent the generation of the zero cross and its resultant generation of an abnormal sound.

However, in the technology described in Japanese Patent Application Laid-open No. 2015-77834, the final target braking/driving torques of the front wheels and the rear wheels are offset in opposite directions. Thus, the generation of the zero cross cannot be prevented in a drive wheel that has a possibility of the generation of the zero cross through control of the final target braking/driving torque of only the drive wheel. Further, the final target braking/driving torques of the front wheels and the rear wheels are increased/decreased in opposite increasing/decreasing directions due to the addition of the offset torques, and thus an undesirable behavior change, e.g., pitching of the vehicle, may be caused due to this increase/decrease. Further, when the zero cross may be generated in both front wheels and rear wheels of a four-wheel drive vehicle, even when addition of offset torques in opposite increasing/decreasing directions is requested, offset torques cannot be added. Thus, the generation of the zero cross cannot be prevented.

SUMMARY

The present disclosure provides an electric vehicle including motors each configured to apply a driving torque to a corresponding drive wheel via each gear-type speed reducer, which is capable of preventing generation of a zero cross for each drive wheel through control of a final target braking/driving torque of only a drive wheel that has a possibility of the generation of the zero cross.

According to one embodiment of the present disclosure, there is provided an electric vehicle, including: motors each configured to apply a driving torque to a corresponding drive wheel via each gear-type speed reducer; a braking apparatus configured to apply a braking torque to each drive wheel independently of one another; and a control device configured to: calculate, for each drive wheel, a final target braking/driving torque, which is a sum of a first target braking/driving torque that is based on a braking/driving operation amount of a driver and a second target braking/driving torque for controlling a travel behavior of the electric vehicle; and control the motors and the braking apparatus so that an actual braking/driving torque of the each drive wheel reaches the final target braking/driving torque.

The control device is configured to correct, when the final target braking/driving torque is a braking torque under a situation in which the first target braking/driving torque is a driving torque, the final target braking/driving torque to a first predetermined value, which is any one of a driving torque and 0.

With the above-mentioned configuration, under the situation in which the first target braking/driving torque is a driving torque, when the final target braking/driving torque changes from the driving torque to a braking torque, the final target braking/driving torque is corrected to the first predetermined value, which is any one of a driving torque and 0. Thus, the final target braking/driving torque does not change from the driving torque to a braking torque, and hence it is possible to prevent generation of the zero cross, which is a change of the actual braking/driving torque of the drive wheel from a driving torque to a braking torque, and its resultant generation of an abnormal sound.

ASPECT OF THE PRESENT DISCLOSURE

In one aspect of the present disclosure, the control device is configured to correct, when the final target braking/driving torque is a driving torque under a situation in which the first target braking/driving torque is a braking torque, the final target braking/driving torque to a second predetermined value, which is any one of a braking torque and 0.

According to the above-mentioned aspect, under the situation in which the first target braking/driving torque is a braking torque, when the final target braking/driving torque changes from the braking torque to a driving torque, the final target braking/driving torque is corrected to the second predetermined value, which is any one of a braking torque and 0. Thus, the final target braking/driving torque does not change from the braking torque to a driving torque, and hence it is possible to prevent generation of the zero cross, which is a change of the actual braking/driving torque of the drive wheel from a braking torque to a driving torque, and its resultant generation of an abnormal sound.

With the above-mentioned two configurations, the final target braking/driving torque of only a drive wheel that has a possibility of the generation of the zero cross may be corrected, Thus, it is possible to prevent the generation of the zero cross without being constrained by situations of other drive wheels, and further, it is possible to avoid generation of an undesirable behavior change, e.g., pitching of the vehicle, due to the increase/decrease of the final target braking/driving torques of the other drive wheels.

DETAILED DESCRIPTION OF THE PREFERRED EMBODIMENTS

Now, a preferred embodiment of the present disclosure is described in detail with reference to the accompanying drawings.

Embodiment

Figure 1:
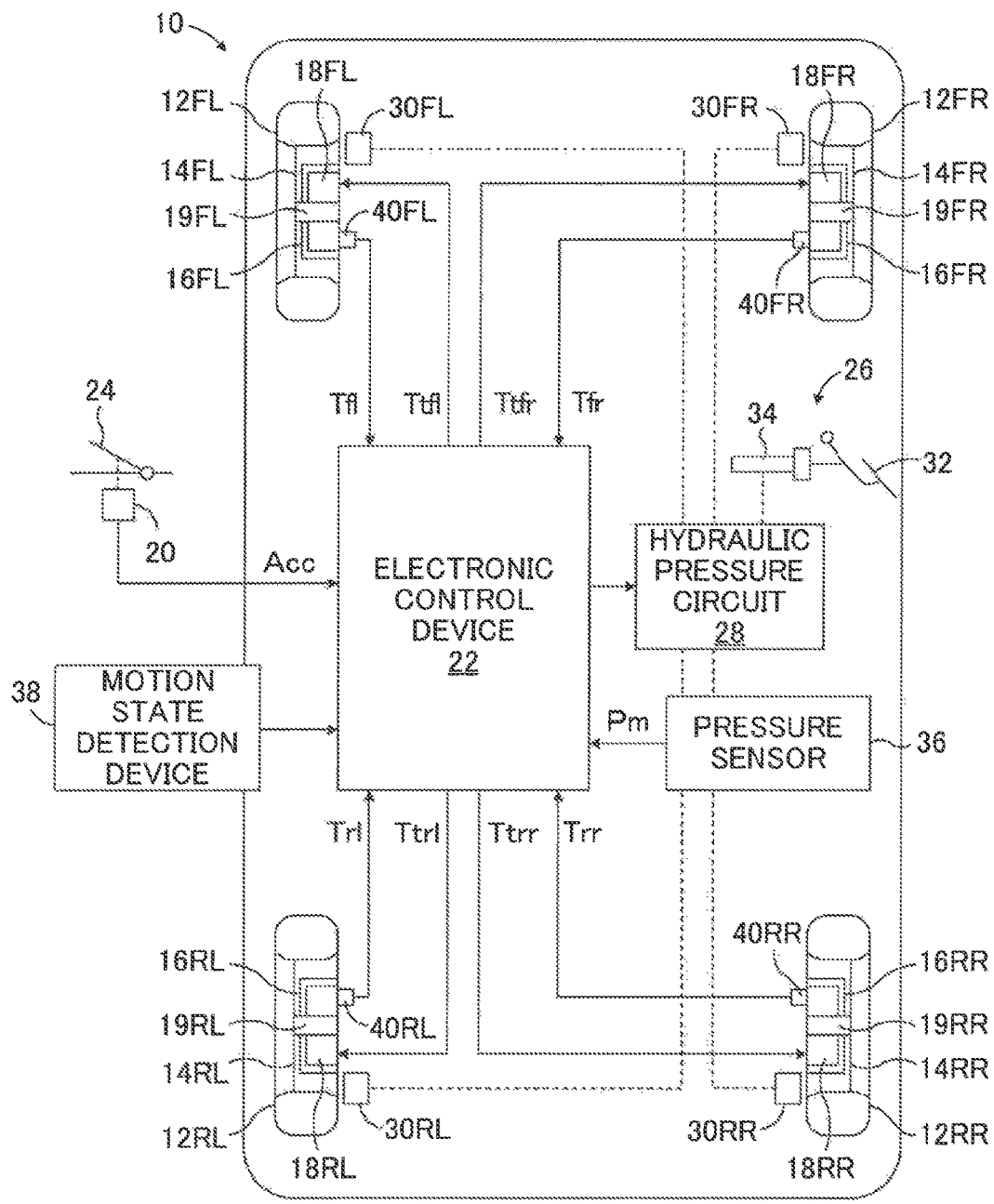
FIG. 1 is a schematic configuration diagram for illustrating an electric vehicle applied to a four-wheel drive vehicle having in-wheel motors according to an embodiment of the present disclosure.

FIG. 1 is a schematic configuration diagram for illustrating an electric vehicle 10 applied to a four-wheel drive vehicle having in-wheel motors according to an embodiment of the present disclosure. The electric vehicle 10 includes left and right front wheels 12FL and 12FR, which are steered wheels, and left and right rear wheels 12RL and 12RR, which are non-steered wheels. The front wheels 12FL and 12FR include wheel members 14FL and 14FR having tires mounted on their outer circumferences, and the wheel members 14FL and 14FR are supported by corresponding wheel support members 16FL and 16FR rotatably around rotation axes of respective wheels. Similarly, the rear wheels 12RL and 12RR include wheel members 14RL and 14RR having tires mounted on their outer circumferences, and the wheel members 14RL and 14RR are supported by corresponding wheel support members 16RL and 16RR rotatably around rotation axes of respective wheels.

The front wheels 12FL and 12FR are driven by being applied with driving torques independently of each other from in-wheel motors 18FL and 18FR respectively incorporated into the wheel support members 16FL and 16FR via gear-type speed reducers 19FL and 19FR. Similarly, the rear wheels 12RL and 12RR are driven by being applied with driving torques independently of each other from in-wheel motors 18RL and 18RR respectively incorporated into the wheel support members 16RL and 16RR via gear-type speed reducers 19RL and 19RR.

The in-wheel motors 18FL to 18RR may each be a motor whose driving torque and rotation speed are controllable, and for example, may be a three-phase brushless AC motor. It is preferred that the in-wheel motors 18FL to 18RR each function as a regenerative generator at the time of braking to generate a regenerative braking torque, but regenerative braking may not be performed.

As described later in detail, the driving torques of the in-wheel motors 18FL to 18RR are controlled by a driving torque control unit of an electronic control device 22 based on an accelerator opening degree Acc detected by an accelerator opening degree sensor 20. The accelerator opening degree Acc indicates a depression amount of an accelerator pedal 24, namely, a driving operation amount of a driver. The regenerative braking torques of the in-wheel motors 18FL to 18RR are controlled by a braking torque control unit of the electronic control device 22 via the driving torque control unit.

During normal traveling of the vehicle 10, electric power charged in a battery that is not illustrated in FIG. 1 is supplied to the in-wheel motors 18FL to 18RR via a drive circuit included in the driving torque control unit. During braking of the vehicle 10, electric power generated through regenerative braking by the in-wheel motors 18FL to 18RR is charged in the battery via the drive circuit.

Friction braking torques are applied to the front wheels 12FL and 12FR and the rear wheels 12RL and 12RR independently of one another by a friction braking apparatus 26. The friction braking torques of the front wheels 12FL and 12FR and the rear wheels 12RL and 12RR are controlled by pressures of corresponding wheel cylinders 30FL, 30FR, 30RL, and 30RR, namely braking pressures, being controlled by a hydraulic pressure circuit 28 of the friction braking apparatus 26. Although not illustrated in FIG. 1, the hydraulic pressure circuit 28 includes a reservoir, an oil pump, various valve apparatus, and the like.

The pressures within respective wheel cylinders 30FL to 30RR are usually controlled based on a pressure within a master cylinder 34 (hereinafter referred to as "master cylinder pressure"), which is driven in response to depression of a brake pedal 32 by the driver. The master cylinder pressure indicates a depressing force applied to the brake pedal 32, namely, a braking operation amount of the driver. Further, irrespective of the depression amount of the brake pedal 32 by the driver, the pressures within respective wheel cylinders are controlled by the oil pump and various valve apparatus being controlled by the braking torque control unit of the electronic control apparatus 22 as necessary.

In the illustrated embodiment, the friction braking apparatus 26 is a hydraulic friction braking apparatus, but may be an electromagnetic friction braking apparatus as long as a friction braking torque can be applied to each wheel independently of one another.

Although not illustrated in FIG. 1, the electronic control apparatus 22 includes, in addition to the driving torque control unit and the braking torque control unit, an integral control unit configured to control those control units. Respective control units are configured to transmit or receive a signal to/from one another as necessary. The integral control unit is basically configured to control the braking/driving torques of the four wheels through control of the in-wheel motors 18FL to 18RR and the friction braking apparatus 26 via the driving torque control unit and the braking torque control unit so that the braking/driving torque of the vehicle matches with a braking/driving torque requested by the driver.

Although not illustrated in detail in FIG. 1, the control units of the electronic control apparatus 22 each include a microcomputer and a drive circuit, and are configured to transmit or receive necessary information to/from one another. Each microcomputer generally includes a CPU, a ROM, a RAM, and an input and output port device, those components being connected to one another via a bilateral common bus.

A signal indicating a master cylinder pressure Pm is input to the electronic control device 22 from a pressure sensor 36 in addition to a signal indicating the accelerator opening degree Acc from the accelerator opening degree sensor 20. Further, signals indicating parameters relating to motion states of the vehicle 10, such as a vehicle speed, a yaw rate, a longitudinal acceleration, and a lateral acceleration of the vehicle 10, are input to the electronic control device 22 from a motion state detection device 38. Torque sensors 40FL to 40RR are built into the in-wheel motors 18FL to 18RR, respectively. Signals indicating driving torques Ti (i=fl, fr, rl, and rr) of the in-wheel motors 18FL to 18RR are input to the electronic control device 22 from the corresponding torque sensors 40FL to 40RR.

Figure 2:
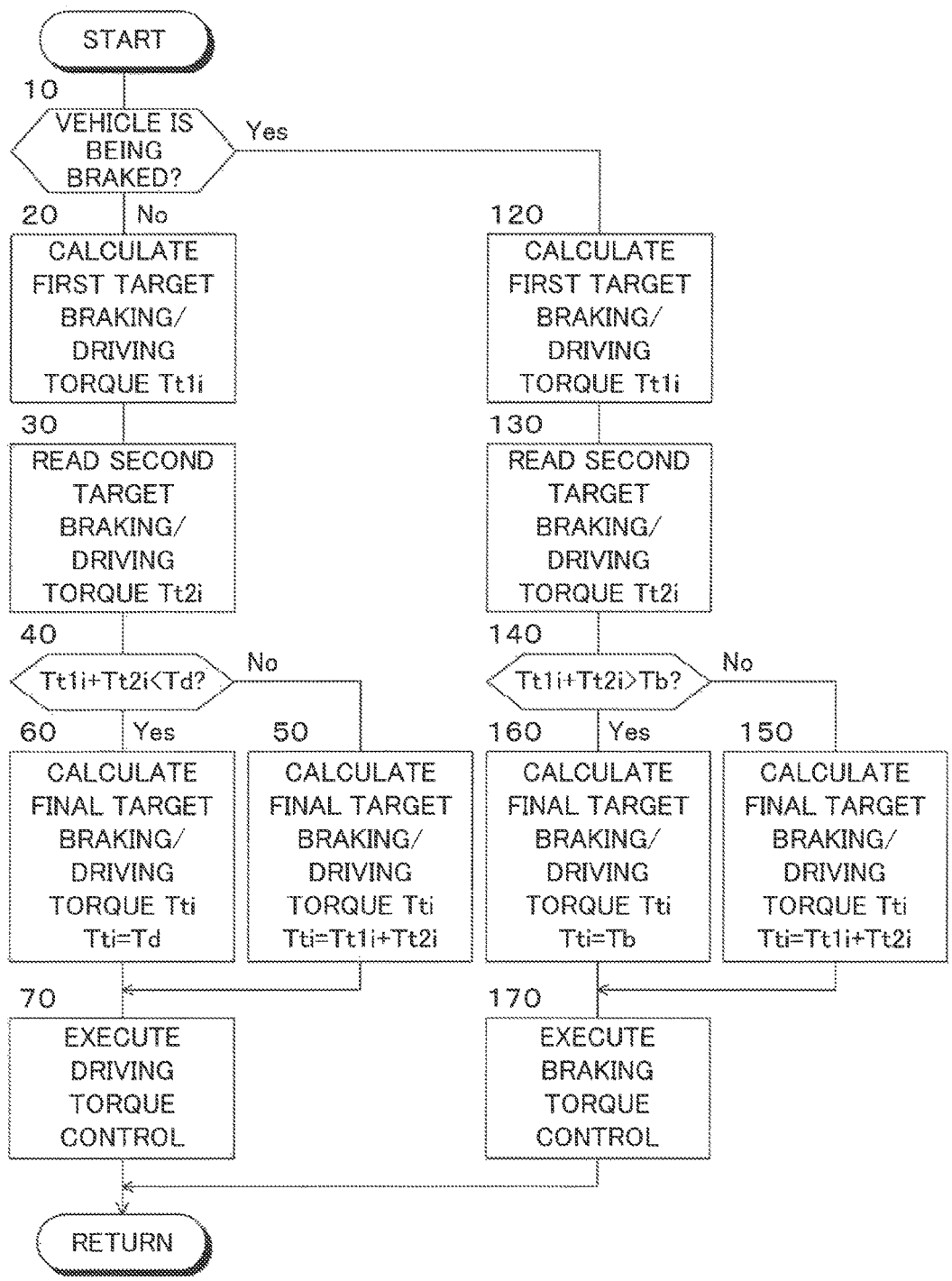
FIG. 2 is a flowchart for illustrating a control routine of braking/driving torques of wheels according to the embodiment.

The electronic control device 22 is configured to calculate a first target braking/driving torque Tt1$i$ (i=fl, fr, rl, and rr) of each wheel that is based on a braking operation amount of the driver, based on the accelerator opening degree Acc and the master cylinder pressure Pm in accordance with a flowchart illustrated in FIG. 2. Although not illustrated in the flowchart, the electronic control device 22 is configured to calculate a second target braking/driving torque Tt2$i$ (i=fl, fr, rl, and rr) of each wheel for controlling the travel behavior of the vehicle 10.

The second target braking/driving torque Tt2$i$ may be calculated in an arbitrary manner. For example, as described in Japanese Patent Application Laid-open No. 2015-77834, the second target braking/driving torque Tt2$i$ may be calculated as a target braking/driving torque for controlling the roll motion, the pitch motion, the yaw motion, and the heave motion of the vehicle 10, based on parameters relating to motion states of the vehicle 10, such as a vehicle speed, a yaw rate, a longitudinal acceleration, and a lateral acceleration of the vehicle 10.

Further, the electronic control device 22 is configured to calculate a final target braking/driving torque Tti (i=fl, fr, rl, and rr), which is a sum of the first target braking/driving torque Tt1$i$ and the second target braking/driving torque Tt2$i$, Further, the electronic control device 22 is configured to control outputs of the in-wheel motors 18FL to 18RR and outputs of the friction braking apparatus 26 so that a braking/driving torque Ti (i=fl, fr, rl, and rr) of each wheel reaches a corresponding final target braking/driving torque.

The first target braking/driving torque Tt1$i$, the second target braking/driving torque Tt2$i$, and the final target braking/driving torque Tti are positive values when those torques are driving torques and negative values when those torques are braking torques.

Next, a description is given of control of the braking/driving torques of the wheels in the embodiment with reference to the flowchart illustrated in FIG. 2. Control in accordance with the flowchart illustrated in FIG. 2 is repeatedly executed at predetermined time periods in order of, for example, a left front wheel, a right front wheel, a left rear wheel, and a rear right wheel when an ignition switch (not shown) is on. In the following description, control of the braking/driving torques of the wheels in accordance with the flowchart illustrated in FIG. 2 is simply referred to as "control".

First, in Step 10, it is determined whether or not the vehicle is being braked based on the master cylinder pressure Pm or a signal from a brake switch (not shown). When an affirmative determination is made, the control proceeds to Step 120, whereas when a negative determination is made, the control proceeds to Step 20.

In Step 20, the first target braking/driving torque Tt1$i$ of each wheel that is based on a braking/driving operation amount of the driver is calculated based on the accelerator opening degree Acc and a ratio of distributing the driving torque to the front and rear wheels set in advance. For example, it is assumed that the target driving torque of the entire vehicle that is based on the accelerator opening degree Acc is Tdtall, and the ratio of distributing the driving force to the front wheels is Rdf (value larger than 0 and smaller than 1). Both of first target braking/driving torques of left and right front wheels Tt1$fl$ and Tt1$fr$ are calculated to be TdtallRdf/2, and both of first target braking/driving torques of left and right rear wheels Tt1$rl$ and Tt1$rr$ are calculated to be Tdtall(1−Rdf)/2. The accelerator opening degree Acc is a positive value or 0, and thus the first target braking/driving torque Tt1$i$ is calculated to be a driving torque (positive value or 0).

In Step 30, the second target braking/driving torque Tt2$i$ of each wheel for controlling the travel behavior of the vehicle 10 is read based on parameters relating to motion states of the vehicle 10, such as a vehicle speed, a yaw rate, a longitudinal acceleration, and a lateral acceleration of the vehicle 10. The second target braking/driving torque Tt2$i$ is calculated as a target braking/driving torque for controlling, for example, the roll motion, the pitch motion, the yaw motion, and the heave motion of the vehicle 10, and thus may be any one of the driving torque (positive value or 0) and the braking torque (negative value).

In Step 40, it is determined whether or not a sum Tt1$i$+Tt2$i$ of the first target braking/driving torque Tt1$i$ and the second target braking/driving torque Tt2$i$ is less than a reference value Td (positive constant) set in advance, that is, whether or not the second target braking/driving torque Tt2$i$ needs to be corrected. When an affirmative determination is made, the control proceeds to Step 60, whereas when a negative determination is made, the control proceeds to Step 50.

When the final target braking/driving torque Tti is a small positive value, it is preferred that the reference value Td be set in consideration of a regular friction force in a torque transmission system from each in-wheel motor to a corresponding wheel so that the torques of the wheels do not take negative values due to the above-mentioned regular friction force.

In Step 50, the final target braking/driving torque Tti is set to the sum Tt1i+Tt2i of the first target braking/driving torque Tt1i and the second target braking/driving torque Tt2i. In other words, the second target braking/driving torque Tt2i is not corrected.

In Step 60, the final target braking/driving torque Tti is set to the reference value Td (first predetermined value) irrespective of the first target braking/driving torque Tt1i and the second target braking/driving torque Tt2i. In other words, the second target braking/driving torque Tt2i is corrected to be Td−Tt1i, and the final target braking/driving torque Tti is set to a sum of the first target braking/driving torque Tt1i and the corrected second target braking/driving torque Tt2i(=Td−Tt1i).

In Step 70, the driving torques Tdi of the in-wheel motors 16FL to 16RR are feedback-controlled so that the actual driving torques Tdi of the wheels reach the corresponding final target braking/driving torques Tti.

In Step 120, the first target braking/driving torque Tt1i of each wheel that is based on a braking/driving operation amount of the driver is calculated based on the master cylinder pressure Pm and the ratio of distributing the braking torque to the front and rear wheels set in advance. For example, it is assumed that the target braking torque of the entire vehicle that is based on the master cylinder pressure Pm is Tbtall, and the ratio of distributing the braking force to the front wheels is Rbf (value larger than 0 and smaller than 1). Both of the first target braking/driving torques of left and right front wheels Tt1fl and Tt1fr are calculated to be TbtallRbf/2, and both of the first target braking/driving torques of left and right rear wheels Tt2rl and Tt1rr are calculated to be Tbtall(1−Rbf)/2. The master cylinder pressure Pm is a positive value, and thus the first target braking/driving torque Tt1i is calculated to be a braking torque (negative value).

In Step 130, as in Step 30, the second target braking/driving torque Tt2i of each wheel for controlling the travel behavior of the vehicle 10 is read. The second target braking/driving torque Tt2i read in this step may also be any one of the driving torque (positive value or 0) and the braking torque (negative value).

In Step 140, it is determined whether or not the sum Tt1i+Tt2i of the first target braking/driving torque Tt1i and the second target braking/driving torque Tt2i is larger than a reference value Tb (negative constant) set in advance, that is, whether or not the second target braking/driving torque Tt2i needs to be corrected. When an affirmative determination is made, the control proceeds to Step 160, whereas when a negative determination is made, the control proceeds to Step 150.

The absolute value of the reference value Tb may be the same as that of the reference value Td, but the regular friction force in a torque transmission system from each in-wheel motor to a corresponding wheel applies negative torques to the wheels, and thus the absolute value of the reference value Tb may be smaller than that of the reference value Td.

In Step 150, as in Step 50, the final target braking/driving torque Tti is set to the sum Tt1i−Tt2i of the first target braking/driving torque Tt1i and the second target braking/driving torque Tt2i, In other words, the second target braking/driving torque Tt2i is not corrected.

In Step 160, the final target braking/driving torque Tti is set to the reference value Tb (second predetermined value) irrespective of the first target braking/driving torque Tt1i and the second target braking/driving torque Tt2i. In other words, the second target braking/driving torque Tt2i is corrected to be Tb−Tt1i, and the final target braking/driving torque Tti is set to a sum of the first target braking/driving torque Tt1i and the corrected second target braking/driving torque Tt2i(=Tb−Tt1i).

In Step 170, the outputs of the friction braking apparatus 26 are feedforward-controlled so that the braking torques of the wheels reach the corresponding final target braking/driving torques Tti.

Next, a description is given of a behavior of the embodiment for (A) a case in which the vehicle is not being braked and for (B) a case in which the vehicle is being braked.

(A) Case in which Vehicle is not being Braked

In Step 10, a negative determination is made, and Steps 20 to 70 are executed. In Step 20, the first target braking/driving torque Tt1i (positive value) of each wheel that is based on a braking/driving operation amount of the driver is calculated, and in Step 30, the second target braking/driving torque Tt2i of each wheel for controlling the travel behavior of the vehicle 10 is read.

When the sum Tt1i+Tt2i of the first target braking/driving torque Tt1i and the second target braking/driving torque Tt2i is equal to or larger than the reference value Td, a negative determination is made in Step 40. In this situation, there is no concern of the final target braking/driving torque Tti, which is a positive value, taking a negative value to cause the zero cross, and thus in Step 50, the final target braking/driving torque Tti is set to the sum Tt1i+Tt2i of the first target braking/driving torque Tt1i and the second target braking/driving torque Tt2i.

In contrast, when the sum Tt1i+Tt2i of the first target braking/driving torque Tt1i and the second target braking/driving torque Tt2i is less than the reference value Td, an affirmative determination is made in Step 40. In this situation, there is a concern of the final target braking/driving torque Tti, which is a positive value, taking a negative value to cause the zero cross, and thus in Step 60, the final target braking/driving torque Tti is set to the reference value Td, which is a positive value, to thereby prevent the final target braking/driving torque Tti from taking a negative value.

Figure 3:
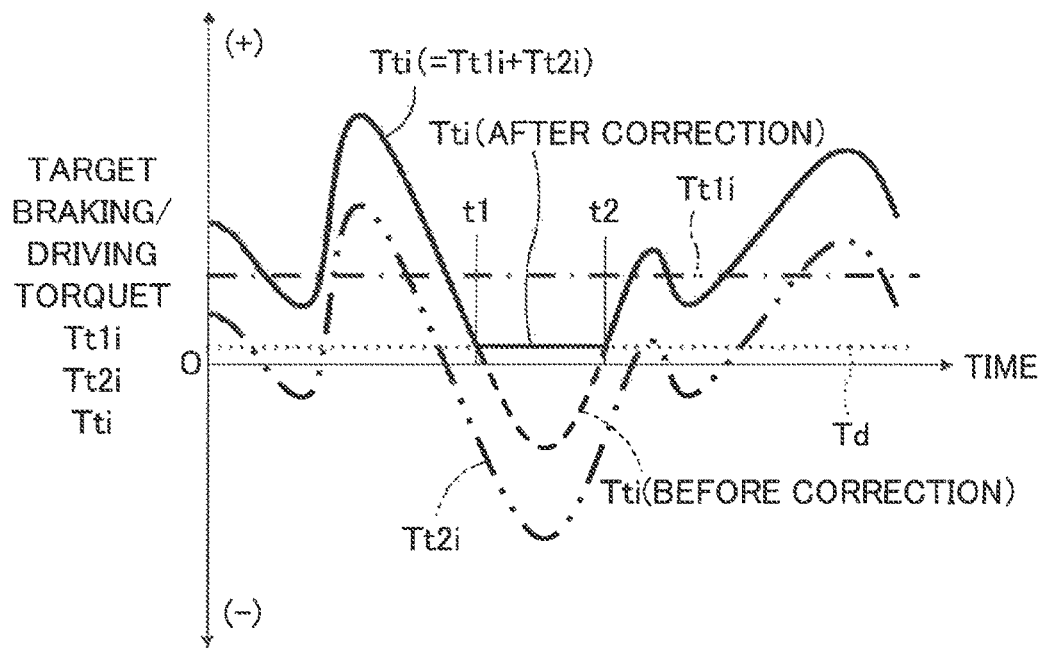
FIG. 3 is an explanatory diagram for showing a behavior of the embodiment under a situation in which a first target braking/driving torque is a driving torque.

FIG. 3 is an explanatory diagram for showing a behavior of the embodiment under a situation in which the first target braking/driving torque Tt1i is a driving torque. In FIG. 3, the long dashed short dashed line indicates the first target braking/driving torque Tt1i, which is shown as a constant positive value for the sake of description. The long dashed double-short dashed line indicates the second target braking/driving torque Tt2i, and the dotted line indicates the reference value Td. Further, the solid line indicates the final target braking/driving torque Tti in the embodiment, and the broken line indicates the final target braking/driving torque Tti in the related art.

In the example shown in FIG. 3, the sum Tt1i+Tt2i of the first target braking/driving torque Tt1i and the second target braking/driving torque Tt2i is less than the reference value Td from the time t1 to the time t2, and an affirmative determination is made in Step 40. Thus, in Step 60, the final target braking/driving torque Tti from the time t1 to the time t2 is set to the reference value Td, which is a positive constant. In this case, the reference value Td functions as a safety margin for preventing the final target braking/driving torque Tti, which is a positive value, from taking a negative value. Therefore, compared to the case of a modified example of the present disclosure described later, which is substantially equivalent to setting the reference value Td to 0, it is possible to more effectively prevent the generation of the zero cross and its resultant generation of an abnormal sound under a situation in which the first target braking/driving torque Tt1$i$ is a driving torque.

The final target braking/driving torque Tti is set to the sum Tt1$i$+Tt2$i$ in Step 50 as long as the sum Tt1$i$+Tt2$i$ is equal to or larger than the reference value Td irrespective of the magnitude of the sum Tt1$i$+Tt2$i$, which is a positive value, and the final target braking/driving torque Tti is not corrected to a value other than the sum Tt1$i$+Tt2$i$.

(B) Case in which Vehicle is being Braked

In Step 10, an affirmative determination is made, and Steps 120 to 170 are executed. In Step 120, the first target braking/driving torque Tt1$i$ (negative value) of each wheel that is based on a braking/driving operation amount of the driver is calculated, and in Step 130, the second target braking/driving torque Tt2$i$ of each wheel for controlling the travel behavior of the vehicle 10 is calculated.

When the sum Tt1$i$+Tt2$i$ of the first target braking/driving torque Tt1$i$ and the second target braking/driving torque Tt2$i$ is equal to or less than the reference value Tb, a negative determination is made in Step 140. In this situation, there is no concern of the final target braking/driving torque Tti, which is a negative value, taking a positive value to cause the zero cross, and thus in Step 150, the final target braking/driving torque Tti is set to the sum Tt1$i$+Tt2$i$ of the first target braking/driving torque Tt1$i$ and the second target braking/driving torque Tt2$i$.

In contrast, when the sum Tt1$i$+Tt2$i$ of the first target braking/driving torque Tt1$i$ and the second target braking/driving torque Tt2$i$ is larger than the reference value Tb, an affirmative determination is made in Step 140. In this situation, there is a concern of the final target braking/driving torque Tti, which is a negative value, taking a positive value to cause the zero cross, and thus in Step 160, the final target braking/driving torque Tti is set to the reference value Tb, which is a negative value, to thereby prevent the final target braking/driving torque Tti from taking a positive value.

Figure 4:
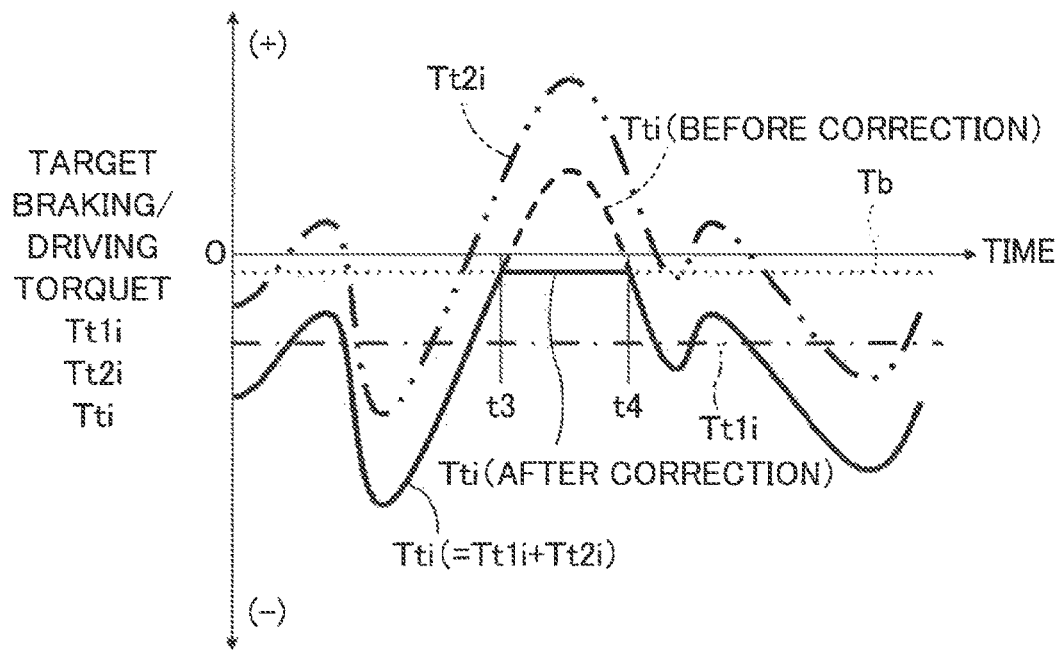
FIG. 4 is an explanatory diagram for showing a behavior of the embodiment under a situation in which the first target braking/driving torque is a braking torque.

FIG. 4 is an explanatory diagram for showing a behavior of the embodiment under a situation in which the first target braking/driving torque Tt1$i$ is a braking torque. In FIG. 4, the long dashed short dashed line and other lines indicate the same torques as in FIG. 3, respectively, and the first target braking/driving torque Tt1$i$ is shown as a constant negative value for the sake of description In the example shown in FIG. 4, the sum Tt1$i$−Tt2$i$ of the first target braking/driving torque Tt1$i$ and the second target braking/driving torque Tt2$i$ is larger than the reference value Tb from the time t3 to the time t4, and an affirmative determination is made in Step 140. Thus, in Step 160, the final target braking/driving torque Tti from the time t3 to the time t4 is set to the reference value Tb, which is a negative constant. In this case, the reference value Tb functions as a safety margin for preventing the final target braking/driving torque Tti, which is a negative value, from taking a positive value. Therefore, compared to the case of the modified example described later, which is substantially equivalent to setting the reference value Tb to 0, it is possible to more effectively prevent the generation of the zero cross and its resultant generation of an abnormal sound under a situation in which the first target braking/driving torque Tt1$i$ is a braking torque.

The final target braking/driving torque Tti is set to the sum Tt1$i$−Tt2$i$ in Step 150 as long as the sum Tt1$i$+Tt2$i$ is equal to or less than the reference value Tb irrespective of the magnitude of the absolute value of the sum Tt1$i$+Tt2$i$, which is a negative value, and the final target braking/driving torque Tti is not corrected to a value other than the sum Tt1$i$+Tt2$i$.

Modified Example

Figure 5:
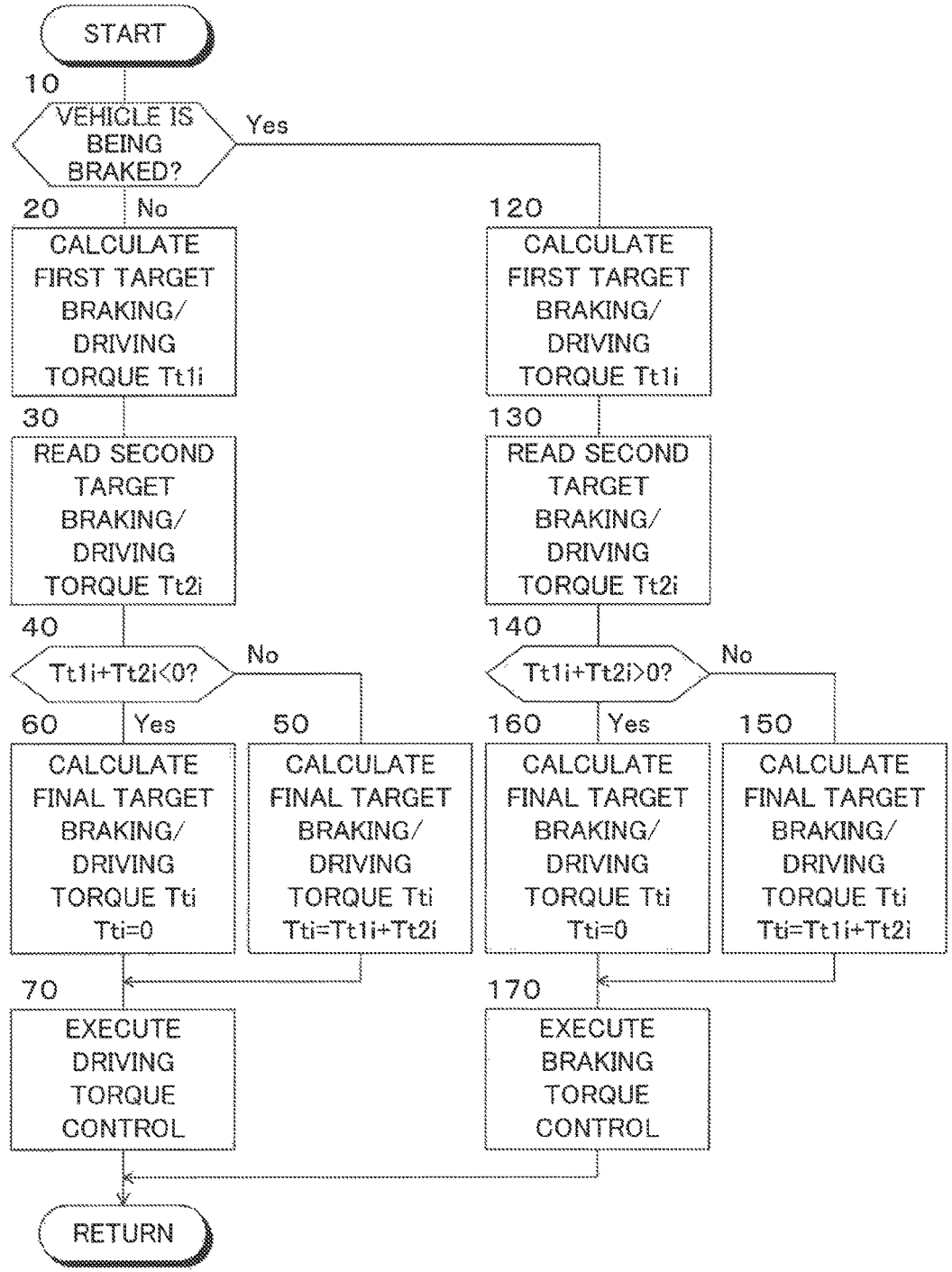
FIG. 5 is a flowchart for illustrating a control routine of braking/driving torques of wheels according to a modified example of the present disclosure.

FIG. 5 is a flowchart for illustrating a routine of controlling the braking/driving torques of the wheels in the modified example. In FIG. 5, steps that are the same as or corresponding to those illustrated in FIG. 2 are denoted by the same step numbers as those of FIG. 2.

In the modified example, steps other than Steps 40, 60, 140, and 160 are executed similarly to the case of the embodiment. Steps 40 and 60 are executed equivalently to those in FIG. 2 by setting the reference value Td in the embodiment to 0, and Steps 140 and 160 are executed equivalently to those in FIG. 2 by setting the reference value Tb in the embodiment to 0.

That is, in Step 40, it is determined whether or not the sum Tt1$i$+Tt2$i$ of the first target braking/driving torque Tt1$i$ and the second target braking/driving torque Tt2$i$ is a negative value. When a negative determination is made, the control proceeds to Step 50, whereas when an affirmative determination is made, the final target braking/driving torque Tti is set to 0 (first predetermined value) in Step 60.

In Step 140, it is determined whether or not the sum Tt1$i$−Tt2$i$ of the first target braking/driving torque Tt1$i$ and the second target braking/driving torque Tt2$i$ is a positive value. When a negative determination is made, the control proceeds to Step 150, whereas when an affirmative determination is made, the final target braking/driving torque Tti is set to 0 (second predetermined value) in Step 160.

Figure 6:
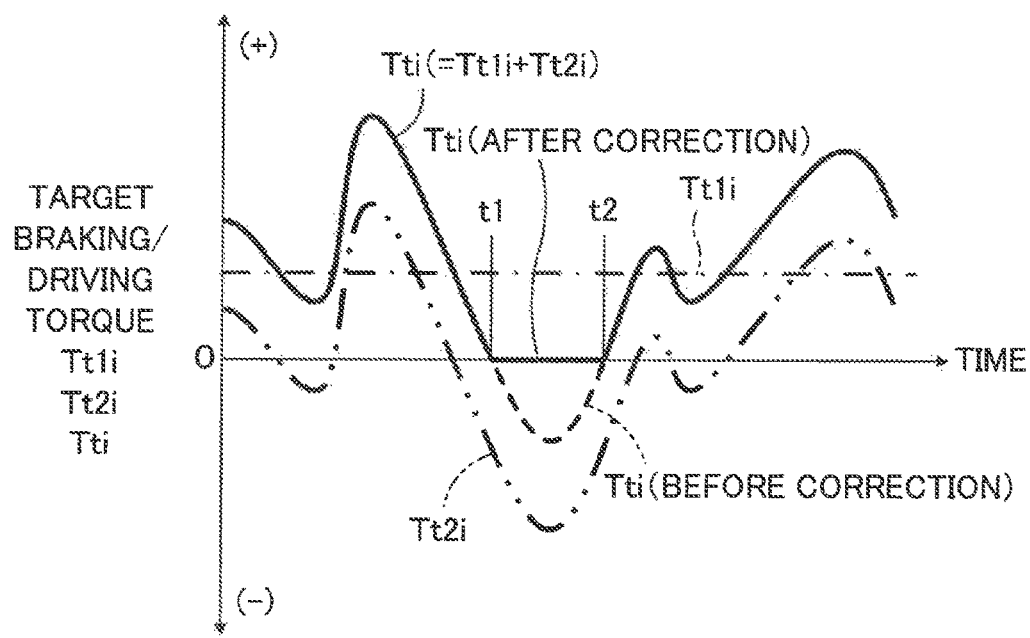
FIG. 6 is an explanatory diagram for showing a behavior of the modified example under a situation in which a first target braking/driving torque is a driving torque.
Figure 7:
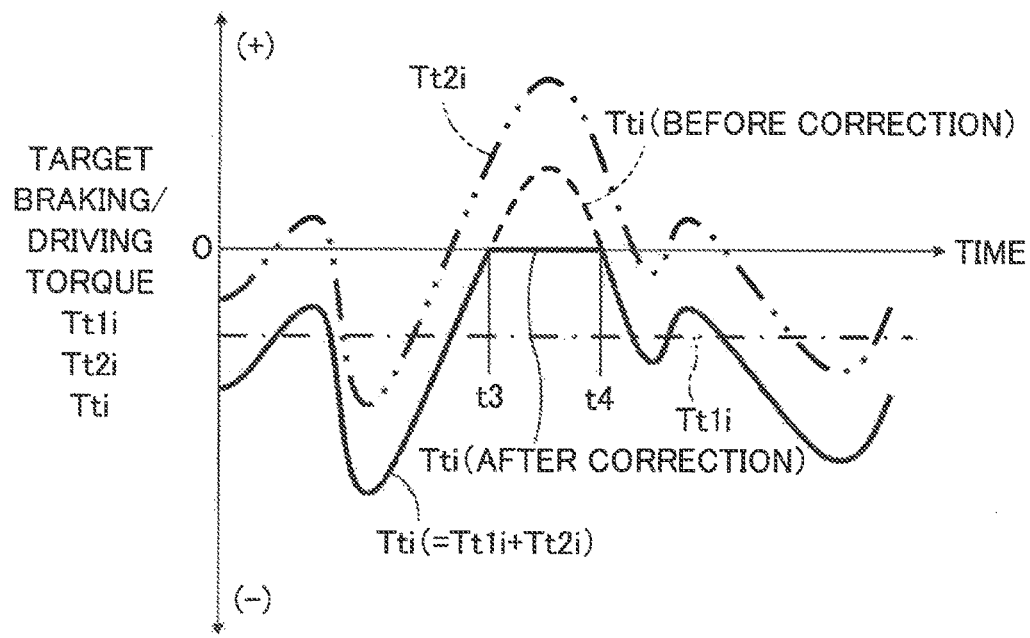
FIG. 7 is an explanatory diagram for showing a behavior of the modified example under a situation in which the first target braking/driving torque is a braking torque.

FIG. 6 and FIG. 7 are explanatory diagrams similar to FIG. 3 and FIG. 4, for showing behaviors of the modified example under situations in which the first target braking/driving torque Tt1$i$ is a driving torque or a braking torque, respectively.

As shown in FIG. 6, the final target braking/driving torque Tti from the time t1 to the time t2 is set to 0 in Step 60. Thus, it is possible to prevent the final target braking/driving torque Tti, which is a positive value, from taking a negative value to cause the zero cross and its resultant generation of an abnormal sound.

As shown in FIG. 7, the final target braking/driving torque Tti from the time t3 to the time t4 is set to 0 in Step 160. Thus, it is possible to prevent the final target braking/driving torque Tti, which is a negative value, from taking a positive value to cause the zero cross and its resultant generation of an abnormal sound.

In the modified example, compared to the case of the embodiment, the correction amount for reducing the absolute value of the second target braking/driving torque Tt2$i$ when an affirmative determination is made in Steps 40 and 140 is small. Thus, it is possible to reduce degradation of effects of the travel behavior control of the vehicle 10 caused by correction of reducing the magnitude of the second target braking/driving torque Tt2$i$, compared to the case of the embodiment.

The specific embodiment of the present disclosure is described in detail above. However, the present disclosure is not limited to the embodiment described above. It is apparent for those skilled in the art that various other embodiments may be employed within the scope of the present disclosure.

For example, in the above-mentioned embodiment, the reference value Td is a positive constant, and the reference value Tb is a negative constant. However, it is preferred that, as the vehicle speed becomes higher, stabilization of the travel behavior state of the vehicle 10 be put more priority than prevention of generation of the zero cross. Thus, the reference values Td and Tb may be variably set depending on the vehicle speed so that, as the vehicle speed becomes higher, the absolute values of those reference values become smaller.

Further, in the above-mentioned embodiment and modified example, control in accordance with the flowcharts illustrated in FIG. 2 and in FIG. 5 is repeatedly executed at predetermined time periods in order of, for example, a left front wheel, a right front wheel, a left rear wheel, and a rear right wheel. However, Steps 20 and 30, and Steps 120 and 130 may be executed as steps common for all the wheels, and Steps 40 to 70, and Steps 140 to 170 may be executed in order of, for example, a left front wheel, a right front wheel, a left rear wheel, and a rear right wheel.

Further, in the above-mentioned embodiment and modified example, the in-wheel motors 18FL to 18RR are configured to apply driving forces to the corresponding wheels 12FL to 12RR independently of one another. However, the present disclosure may be applied to a vehicle whose two front wheels or two rear wheels are coupled driving wheels or drive wheels driven by other driving means.

Further, a switch to be operated by occupants of the vehicle is provided, and when the switch is on, the control in accordance with the flowchart illustrated in FIG. 2 or FIG. 5 is executed, whereas when the switch is off, only Steps 20, 30, 50, and 70, or only Steps 120, 130, 150, and 170 may be executed.

What is claimed is:

1. An electric vehicle, comprising:
   motors each configured to apply a driving torque to a corresponding drive wheel via each gear-type speed reducer;
   a braking apparatus configured to apply a braking torque to each drive wheel independently of one another; and
   a control device configured to:
      calculate, for each drive wheel, a final target braking/driving torque, which is a sum of a first target braking/driving torque that is based on a braking/driving operation amount of a driver and a second target braking/driving torque for controlling a travel behavior of the electric vehicle; and
      control the motors and the braking apparatus so that an actual braking/driving torque of the each drive wheel reaches the final target braking/driving torque,
   wherein the control device is configured to correct, when the final target braking/driving torque is a braking torque under a situation in which the first target braking/driving torque is a driving torque, the final target braking/driving torque to a first predetermined value, which is any one of a driving torque and 0.

2. The electric vehicle according to claim 1, wherein the control device is configured to correct, when the final target braking/driving torque is a driving torque under a situation in which the first target braking/driving torque is a braking torque, the final target braking/driving torque to a second predetermined value, which is any one of a braking torque and 0.

* * * * *